United States Patent Office 3,355,501
Patented Nov. 28, 1967

3,355,501
PROCESS FOR THE PRODUCTION OF
HYDRATED OLEFINS
Efim Biller, Fribourg, Switzerland, and Gottfried Nettesheim and Gerhard Stern, Wesseling, near Cologne, Germany, assignors to Union Rheinische Braunkohlen Kraftstoff Aktiengesellschaft, Wesseling, near Cologne, Germany, a corporation of Germany
No Drawing. Filed June 8, 1965, Ser. No. 462,417
7 Claims. (Cl. 260—614)

This invention relates to a process for hydrating olefines to ethers and alcohols, and more particularly to the production of aliphatic ethers with 4 to 12 carbon atoms and aliphatic alcohols with 2 to 6 carbon atoms in the molecule by reaching the corresponding olefins with water in the presence of halides of metals of the 1st subgroup, and 2nd subgroup, the 2nd main group or the 3rd main group of the Periodic System.

The hydration of olefines is usually carried out in the presence of sulfuric acid as a catalyst. A disadvantage of this process is not only the high corrosiveness of the sulfuric acid, but also the formation of reduction products of the same, which can only be removed with difficulties, and the expensive regeneration of the spent acid. It has also been proposed to use zinc halides as catalysts for the addition of water to olefines. Zinc halides, however, are only of little catalytic activity.

It has been discovered that the production of the said aliphatic ethers and alcohols can be effected in a very satisfactory manner by hydration of olefines with up to 6 carbon atoms in the molecule in the presence of an aqueous solution of an acid-acting catalyst capable of effecting the required water transfer reaction if the process is carried out in the presence of an alkyl halide. Such a catalytic system is very active and less corrosive. Furthermore the alkyl halides can be separated easily from the reaction products i.e. by distillation.

Of special advantage among the metal halides are the zinc halides, especially zinc chloride, because of its high water-solubility. Other preferred catalysts are the halides of copper, calcium, boron, and aluminum. The catalytic activity of the metal halides decreases according to an increase of the water content of the solution, whereby the relation of alcohol to ether is altered for the benefit of producing alcohols.

It is preferred to use halides which correspond to the olefines to be hydrated. However, other alkyl halides up to about 10 carbon atoms in the molecule can also be used.

The reaction velocity is in general increased by adding larger quantities of alkyl halides. Beyond a certain concentration, however, the catalytic activity decreases according to the effect of dilution. For instance if hydrating propylene in the presence of an aqueous solution of zinc chloride a ratio of 1 mol of zinc chloride to 0.2 mol of isopropylchloride to 3 mols of water is advantageous. It is preferred to add the alkyl halide in an amount of about 0.1 mol to 1 mol per mol of the metal halide employed.

The reaction rate depends on the composition of the catalytic system and the kind of olefines being reacted, but mainly on the temperatures employed. In general, temperatures between about 80° C. and 140° C. may be used, the reaction time being in the scope of 7 hours to 5 minutes. To secure a short reaction time, it is advantageous to thoroughly mix the hydrocarbon phase—preferably in liquid form—with the liquid catalyst phase. In order to keep the olefines in liquid form respectively to maintain a high concentration, pressures of more than 60 atmospheres may become necessary. It is to be understood, however, that the invention is not limited as to the temperature and pressure employed.

It is not necessary to hydrate the pure olefines. Technical olefine mixtures i.e. those containing only 40% by weight of propylene can be hydrated. The process is most profitably carried out continuously in a mixing reactor which can be heated, but it may be made batchwise if desired. The reaction products—especially ether and alcohol—can, if necessary after addition of water, be separated from the catalytic system by distillation and be worked up according to known methods. The alkyl halide obtained thereby may be recycled into the reaction zone together with the aqueous solution of the metal halide.

The following examples are submitted only by way of illustration. It will be understood, that many other applications and modifications are possible without departing from the spirit of the invention.

Example 1

(a) A solution of 5720 g. of zinc chloride in 1520 g. of water (molar ratio 1 to 2) was fed into an autoclave of about 15,000 cc. volume fitted with a high speed stirrer to this 7,000 cc. of liquid propylene were pumped in and brought to reaction during 12 hours at 95° C. and 28 atmospheres initial pressure (final pressure 26 atmospheres). The obtained reaction mixture was distilled after addition of water. Only 1210 g. of distillate were obtained, which contained besides small amounts of isopropyl chloride and of a mixture of ether and alcohol in the ratio 1 to 0.36 a considerable quantity of polymerisate.

(b) The experiment was repeated, however, 660 g. of isopropyl chloride (0.2 mol per mol of zinc chloride) were also inserted. As could be seen from the decrease of pressure from 28 to 8 atmospheres, the reaction had in this case already been performed after 4 hours. 3425 g. of a distillate were obtained containing besides 20% of isopropyl chloride and a small amount of olefines a mixture of ether and alcohol at a ratio of 1 to 0.57.

Example 2

In a similar experiment as described in Example 1b zinc chloride, isopropyl chloride and water were used with a molar ratio of 1 to 0.2 to 3.3712 g. of a distillate were obtained after a reaction time of 5 hours. The ether alcohol ratio of distillate was 1 to 0.83.

Example 3

In a similar experiment as described in Example 1b zinc bromide and isopropyl bromide were used instead of zinc chloride and isopropylchloride. In this case the propylene had already been reacted after about 1 hour and the composition of the reaction product was, apart from a slightly higher amount of olefines, practically the same as described in Example 1b.

Example 4

5,000 cc. of a liquid mixture of hydrocarbons with 4 carbon atoms per molecule containing 80% of olefines with a ratio of 1-butene to 2-butene of about 1 to 3 were reacted in an autoclave during 3 hours with about 760 g. of 2-chloro-butane, 5720 g. of zinc chloride, and 1520 g. of water at 80° C. with an initial pressure of 7 atmospheres. After the addition of water to the reaction mixtures there were obtained by vacuum distillation 3035 g. of a distillate, which contained besides small amounts of the alkyl halide and of a polymerisate di-sec-butyl-ether and sec-butyl-alcohol at a ratio of 1 to 0.65.

Example 5

4,000 cc. of a saturated liquid cupric-chloride-solution were mixed with 320 g. of isopropyl chloride and 5,000 cc. of liquid propylene for 6 hours at 95° C. with an initial pressure of 28 atmospheres. The yield of reaction products was 2043 g. Besides 15% of isopropyl chloride and some isopropyl ether the main product received was isopropyl alcohol. When using saturated solutions of aluminum chloride and calcium chloride together with isopropyl chloride similar results were obtained. Only the hydration with calcium chloride brought a smaller yield.

We claim:

1. In the process for the production of alkyl ethers and alkanol by hydration of olefines with 2 to 6 carbon atoms per molecule comprising reacting a mixture consisting essentially of said olefine and an aqueous solution of an acid-acting metal halide selected from the group consisting of the halides of zinc, copper, calcium, boron and aluminum at a temperature of between about 80 and 140° C. and at a pressure sufficient to maintain the olefine in the liquid phase, the improvement which comprises performing the hydration in the presence of an alkyl halide with up to 10 carbon atoms per molecule, the ratio of said alkyl halide being from about 0.1 1.0 mol per mol of metal halide employed.

2. Process according to claim 1, wherein zinc chloride is used as the metal halide.

3. Process according to claim 1, wherein zinc bromide is used as the metal halide.

4. Process according to claim 1, wherein the alkyl halide corresponds to the olefine which is to be hydrated.

5. Process according to claim 1, wherein a mixture of hydrocarbons rich in olefines is used.

6. Process according to claim 1, wherein the hydration is performed under elevated pressures up to about 60 atmospheres.

7. An improved process for the production of isopropyl ether and isopropyl alcohol by hydration of propylene in the presence of an aqueous solution of zinc chloride at a temperature of between about 80° and 140° C. and under a pressure of between about 5 and 60 atmospheres, the improvement which comprises performing the hydration in the presence of isopropyl chloride, the ratio of the isopropyl chloride being from about 0.2 to 0.5 mol per mol of the zinc chloride.

References Cited

UNITED STATES PATENTS

| 2,109,004 | 2/1938 | Archibald et al. | 260—641 |
| 2,126,952 | 8/1938 | Dreyfus | 260—641 |
| 2,135,455 | 11/1938 | Loder | 260—614 |
| 2,148,288 | 2/1939 | Bent | 260—614 |
| 2,430,388 | 11/1947 | Carnell | 260—614 |

FOREIGN PATENTS 635,111   3/1941   Great Britain.

LEON ZITVER, *Primary Examiner.*

H. MARS, *Assistant Examiner.*